May 27, 1930.  E. RYDER  1,760,006
SHOCK ABSORBER
Filed March 12, 1928  2 Sheets-Sheet 2
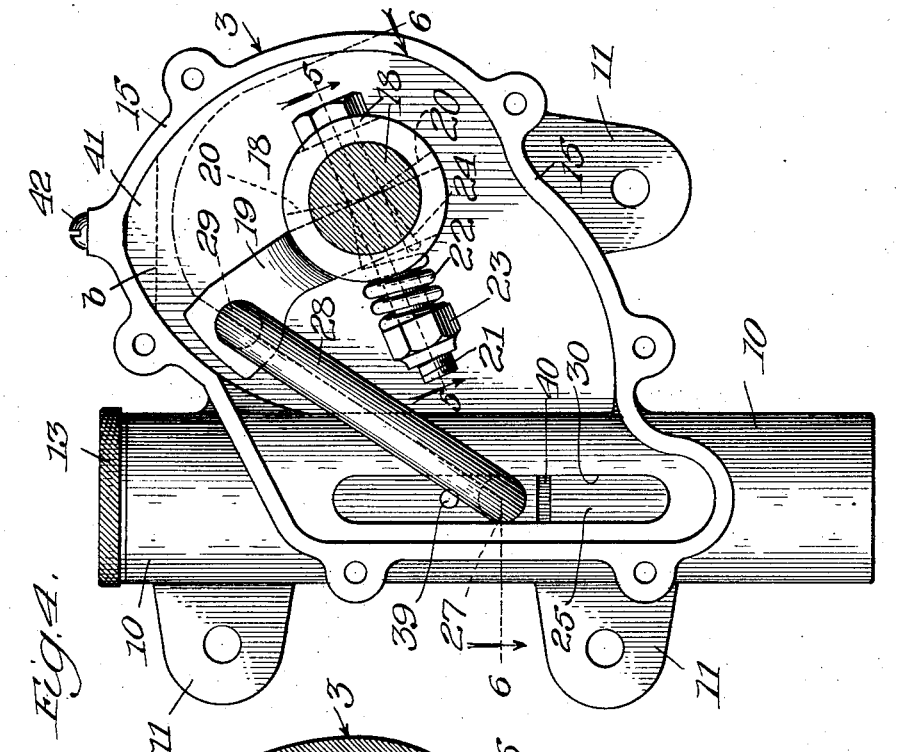
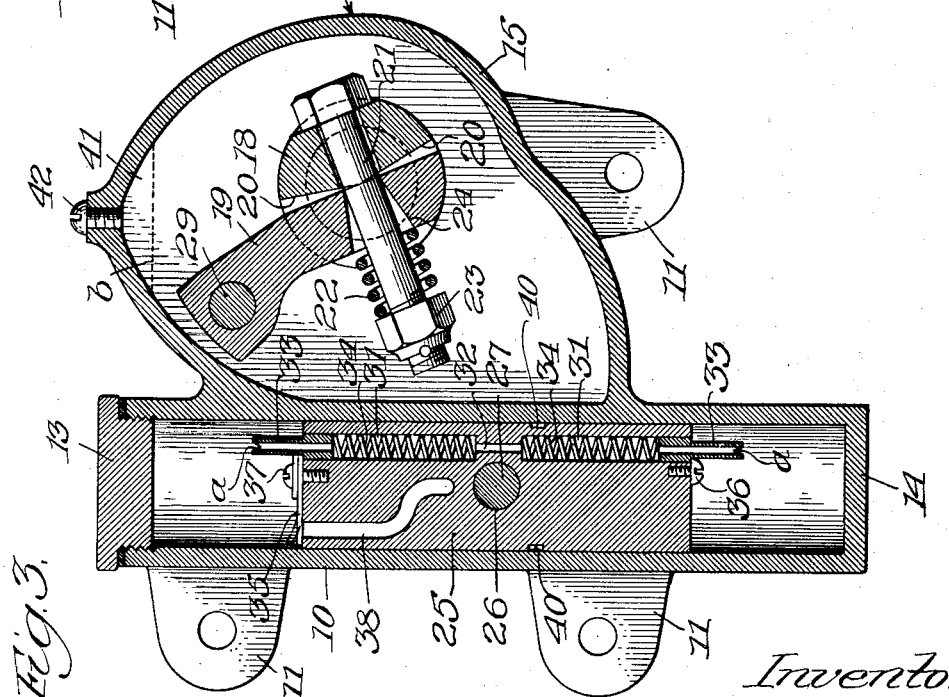
Inventor
Elmer Ryder Patented May 27, 1930

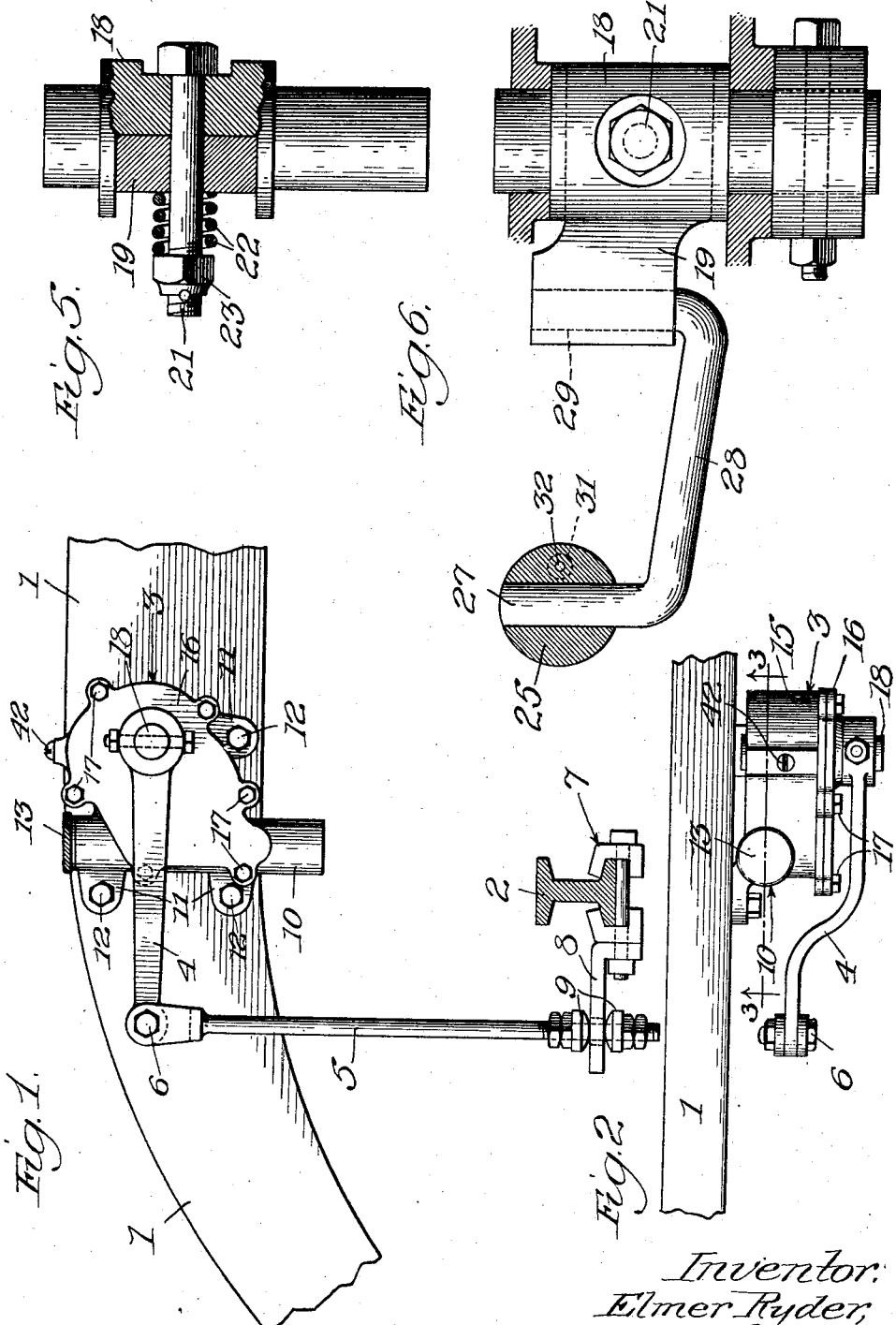

1,760,006

UNITED STATES PATENT OFFICE

ELMER RYDER, OF ELGIN, ILLINOIS

SHOCK ABSORBER

Application filed March 12, 1928. Serial No. 260,828.

This invention relates to hydraulic shock absorbers for motor vehicles, and consists in the matters hereinafter described and claimed.

In the accompanying drawings—

Fig. 1 shows a shock absorber of my invention in its place of use;

Fig. 2 is a top plan view of the same;

Fig. 3 is an enlarged vertical sectional view taken on line 3—3 of Fig. 2;

Fig. 4 is a view looking into the absorber when its cover plate is removed;

Fig. 5 is a vertical sectional view taken on line 5—5 of Fig. 4; and

Fig. 6 is a view taken on line 6—6 of Fig. 4.

In Fig. 1, 1 indicates one of the side members of the spring supported frame or chassis of a motor vehicle, and 2 indicates an axle below the same. 3 indicates the hydraulic shock absorber of my invention secured to the frame member 1 above the axle 2 and having an outside actuating arm 4 which is connected to the axle 2 by a rigid rod 5.

A bolt or other suitable fastening 6 pivotally connects the upper end of the rod 5 with the outer or free end of the arm 4. The lower end of the rod 5 is connected to the axle 2 through a clamp assembly 7 which has a bracket 8 through which the rod extends. Here the rod is screw-threaded to receive nuts 9, 9 on opposite sides of the bracket, as shown. The inner sides of the nuts are curved or rounded where they engage the bracket 8 to make sort of a universal joint connection between the rod and the bracket.

The shock absorbing mechanism comprises a vertically disposed cylinder 10 and outside lugs 11, 11 whereby bolts 12, 12 may rigidly secure the absorber to the side member 1, preferably on the outer side thereof. The cylinder 10 is closed at its opposite ends, as by a screw cap 13 at its upper end and by a bottom wall 14 at its lower end, as shown in Fig. 3.

Cast integral with the cylinder 10 is a casing 15 having one portion in front of the cylinder and the remaining portion at the side of the cylinder opposite the lugs 11. The casing 15 extends outward from the cylinder and is closed at its outer end by a cover plate 16. The latter is detachably secured to the casing (with a gasket interposed) by a number of screws 17, as shown.

A horizontal rock shaft 18 extends from front to rear through the portion of the casing 15 at the side of the cylinder. Said shaft 18 has its ends journaled in the back wall and cover plate 16, respectively, of the casing 15. The actuating arm 4 is exterior of the casing and is fixed at one end to the outer end of said shaft.

Located in the portion of the casing 15 containing the shaft 18 is a flat crank arm 19. Said arm 19 has a yieldable connection at one end with the shaft 18 so that the shaft may turn to a limited extent with respect to said arm for purposes to be presently described. One form of such connection is shown in Figs. 3, 4, and 5, and, as there illustrated, said connection comprises a seat 20 for the arm and one or more bolts 21 extending through the shaft and the arm at the seat for securing the arm thereto. A coil spring 22 is about the bolt below the shaft 18 and bears at its upper end against the shaft and at its lower end against a nut 23 on the bolt whereby the tension of the spring may be varied as desired. The seat 20 may be made by cutting a recess in the shaft 18, and to provide for the greatest amount of rocking movement between the parts, the seat may be given an arcuate shape, as shown in Fig. 3.

To more readily permit of this movement, the holes 24 in the arm and shaft for the bolt are enlarged, as shown.

Slidably mounted in the cylinder 10 is a piston 25, which is shorter than the cylinder so as to provide hydraulic chambers at the opposite ends of the cylinder. Said piston is provided midway of its ends with a centrally disposed hole 26 to receive one right-angular end 27 of a U-shaped link 28. The other right-angular end 29 of the link is received in an opening or eye made in the outer or free end of the arm 19. The wall of the cylinder 10 at the opening 26 is provided with a vertically disposed elongated slot 30, which permits vertical movement of the link end 27 with the piston 25.

Extending longitudinally through the piston 25 from top to bottom is a passage 31 so that the hydraulic medium, such as oil, in the cylinder may be displaced from one end of the cylinder to the other through the piston in the vertical movements of the latter. Said passage 31 is provided between its ends with a restricted portion 32 so as to retard the flow of the fluid and thus retard the action of the piston for shock absorbing purposes.

Arranged at the opposite ends of the passage 31 are tubular members 33, 33. The latter are slidably mounted in the passage 31 and are normally projected beyond the ends of the piston by coiled springs 34, 34. The latter are located in the passage 31 and bear, respectively, against the inner ends of the members 33 and the shoulders provided at the reduced portion 32 of said passage.

Fasteners 35, 36 extend over shoulders at the inner ends of the members 33 to prevent the springs 34 from projecting them completely out of the passage 31. The fastener 35 is in the form of a thin flat strip which is secured to the adjacent end of the piston by a screw 37. The end of this strip opposite the member 33 normaly overlies and closes the open upper end of a passage 38 which is provided in the piston 25 at one side of the passage 31. The passage 38 extends down to near the mid-portion of the piston and there turns outward and opens through the cylindric wall of the piston in a port 39 at the slot 30. This port is so located that it is always open through said slot in any position of movement of the piston in the cylinder 10.

The tubes 33 in projecting beyond the ends of the piston 25 strike the end walls 13, 14 of the cylinder 10 before the ends of the piston reach the same in the reciprocation of the piston. The outer ends of the tubes have V-shaped notches $a$, $a$ therein so that the tubes will not be closed by the end walls of the cylinder when striking the same. Thus, in the upward movement of the piston, the upper tube 33 will reach into any trapped air which may be above the piston and allow such air to be displaced to the lower end of the cylinder in the upward movement of the piston. This displaced air will rise to the under side of the piston, and on the downward movement of the piston be forced upward around the sides thereof and flow into an annular groove or channel 40 made in the cylindrical wall of the piston in the region of the slot 30. The fit of the piston 25 in the cylinder 10 is not so tight as to prevent this air flow, and the air on reaching the groove 40 will find outlet through the slot 30 and bubble up through the body of oil in the casing 15 and enter the free space 41 at the top of said casing above the oil level $b$ therein, as shown in Fig. 3.

The upper end of the casing 15 extends above the cylinder 10 so that the oil level will normally stand above the cylinder so as to insure filling of the free spaces in the cylinder 10 with oil. A removable plug 42 is at the top of the casing 15 whereby it may be filled with oil.

In the downward movement of the piston, a slight suction is created in the upper end of the cylinder, and as a result oil flows from the casing 15 (which serves as a reservoir) into the passage 38 through the port 39. Under this suction the incoming oil lifts the end of the strip 35 over the upper end of said passage and allows the oil to enter the upper end of the cylinder to replace the expelled air. Thus a sufficient amount of oil is automatically maintained at the opposite ends of the piston to insure proper hydraulic action of the device.

On first filling the device with the hydraulic medium, air will be trapped in the upper end of the cylinder. This air will be forced out of the cylinder in the first movements of the device and any further air that may find its way into the cylinder will be expelled therefrom and the cylinder be automatically filled with oil, as described.

When applied to a vehicle, the piston 25 normally stands substantially midway the length of the cylinder 10, as shown in Fig. 3, and the actuating arm 4 is substantially horizontal, as shown in Fig. 1. In the travel of the vehicle over a relatively smooth roadway, as provided by concrete or brick pavements, the yieldable connection between shaft 18 and arm 19 will permit the shaft and its actuating arm 4 to move up or down or float within limits and thus not subject the absorber to the relatively small shocks received by the wheels. Thus the body of the vehicle is not repeatedly jerked out of its normal horizontal position and the car rides steadily.

Should the wheels drop into a hole or run over an upraised obstruction of a character that moves the arm 4 beyond the limits of its floating action, then the shaft 18 is turned far enough to swing the arm 19 and raise or lower the piston 25, depending on the direction of the shock. In this movement of the piston 25, the oil is displaced from one end of the piston to the other, and, by the passage 32, the flow is retarded so as to cause the piston to resist the shock and absorb it in the oil. With oil at opposite ends of the piston, the absorber is double acting.

Any air collecting in the upper end of the cylinder 10 above the piston will be expelled out of the cylinder in the manner previously described, and the absorber will not become air bound to hinder its effective action.

In the event of an excessive shock, as when the wheels drop into a deep hole or run over a large bump, the flow of the oil through the restriction 32 would be so slow that the piston could not move fast enough to compensate for such a shock. By the yieldable connection heretofore described, the shaft 18 will be permitted to yield with respect to the arm 19 and thus move quickly under such shock and relieve the piston and associated parts of excessive strain.

Manifestly, with my improvements the yieldable connection between the arm 4 and the shock absorbing mechanism is such as to relieve the slower moving mechanism of relatively light and excessive shocks and thus saves the mechanism of excessive wear and strain.

The details of structure and arrangement of parts may be variously changed and modified without departing from the spirit and scope of my invention.

I claim as my invention:

1. A shock absorber for motor vehicles, comprising, in combination, an actuating arm, shock absorbing means operable by said arm, and a yieldable connection between said arm and said means whereby the arm may yield with respect to said means under excessive or relatively light shocks.

2. A shock absorber for motor vehicles, comprising, in combination, an actuating arm, shock absorbing means operable by said arm, and a yieldable connection between said arm and said means whereby the arm may have a floating action with respect to said means under relatively light shocks.

3. A shock absorber for motor vehicles, comprising, in combination, shock absorbing means, a rock shaft, a crank arm for said shaft and having one end connected with said means, and yieldable means connecting the other end of the arm to said shaft whereby the arm may yield with respect to said shaft under excessive or relatively light shocks.

4. A shock absorber for motor vehicles, comprising, in combination, shock absorbing means, a rock shaft, a crank arm for said shaft, a yieldable connection between one end of said arm and said shaft whereby the arm may yield with respect to said shaft under excessive or relatively light shocks, and a rigid link pivotally connecting the other end of the arm to said shock absorbing means.

5. A shock absorber for motor vehicles, comprising, in combination, shock absorbing means including a piston, a rock shaft, a crank arm, a yieldable connection between one end of said arm and said shaft whereby the arm may yield with respect to said shaft under excessive or relatively light shocks, and a rigid link connecting the other end of said arm to said piston, said link being substantially U-shaped and having its ends pivotally received in openings in the arm and piston, respectively.

6. A shock absorber for motor vehicles, comprising, in combination, a rock shaft having a seat, an arm having a substantially flat portion at its inner end, spring means yieldably connecting the arm at its flat portion to said seat, and shock absorbing means operable through said shaft.

7. A shock absorber for motor vehicles, comprising, in combination, a rock shaft, a crank arm for said shaft, means providing a rockable seat between the inner end of said arm and said shaft, spring means yieldably connecting said arm to said shaft at said seat, and shock absorbing means operable through said shaft.

8. A hydraulic shock absorber for motor vehicles, comprising, in combination, an upright cylinder with closed ends, a reciprocable piston in said cylinder, means whereby trapped air may be transferred from the upper to the lower end of the cylinder in the upward movement of the piston, and means whereby such displaced air may escape from the lower end of the cylinder and be automatically replaced by the hydraulic medium in the downward movement of the piston.

9. A hydraulic shock absorber for motor vehicles, comprising, in combination, an upright cylinder with closed ends, a piston in said cylinder and having a longitudinal passage therethrough, spring pressed tubular members slidably retained in said passage at the opposite ends thereof, said members being open at both ends and projecting beyond the piston for transferring trapped air from the upper to the lower end of the cylinder in the upward movement of the piston, and means whereby the air may escape from the lower end of the cylinder and be automatically replaced by the hydraulic medium.

10. A hydraulic shock absorber for motor vehicles, comprising, in combination, an upright cylinder having closed ends and a slot in its cylindric wall, a piston in said cylinder over said slot, means whereby trapped air may be transferred from the upper to the lower end of the cylinder in the upward movement of the piston, a hollow casing secured to said cylinder in communication with said slot and containing a supply of hydraulic medium for the cylinder, a groove in the outer surface of the piston at said slot, whereby the displaced air may escape from the lower end of the cylinder into the casing, a passage in said piston and communicating the slot with the upper end of the cylinder, and a valve carried by the piston for said passage and opening under the suction in the downward movement of the piston.

In testimony whereof I affix my signature.

ELMER RYDER.